W. J. MEHARRY.
Sulky-Plow.

No. 220,633. Patented Oct. 14, 1879.

WITNESSES:
Henry N. Miller
C. Sedgwick

INVENTOR:
W. J. Meharry
BY
ATTORNEYS.

UNITED STATES PATENT OFFICE.

WILLIAM J. MEHARRY, OF STATE LINE, INDIANA, (SHELDON, ILLINOIS, P. O.)

IMPROVEMENT IN SULKY-PLOWS.

Specification forming part of Letters Patent No. 220,633, dated October 14, 1879; application filed February 20, 1879.

*To all whom it may concern:*

Be it known that I, WILLIAM J. MEHARRY, of State Line, in the county of Newton and State of Indiana, (post-office address, Sheldon, in the county of Iroquois and State of Illinois,) have invented a new and useful Improvement in Sulky Attachments for Plows, of which the following is a specification.

Figure 1:
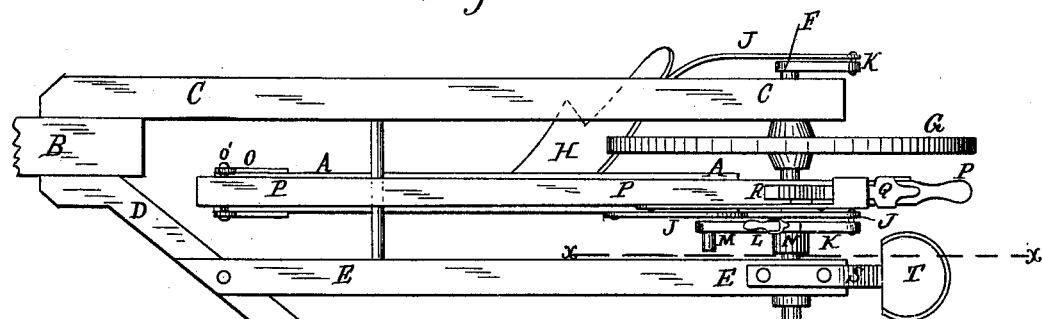
Figure 3:
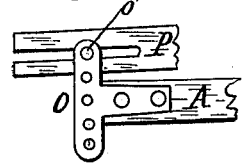
Figure 2:
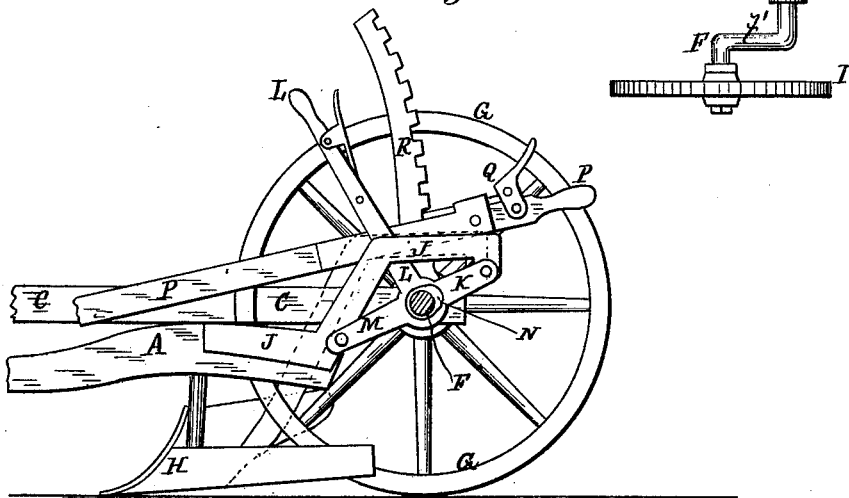

Figure 1 is a top view of my improved attachment shown as applied to a plow. Fig. 2 is a detail vertical section of the same, taken through the line $x\,x$, Fig. 1. Fig. 3 is a detail side view of the forward end of the plow-beam and its lever.

Similar letters of reference indicate corresponding parts.

The object of this invention is to furnish an improved sulky attachment for plows which shall be simple in construction, may be readily attached to any ordinary plow, will materially lighten the draft, will allow the plow to be readily controlled, and shall be comparatively inexpensive in manufacture.

A represents the beam of an ordinary plow. B represents the tongue, to the plowed-land side of the rear end of which is attached the forward end of a bar, C, extending back parallel with the line of draft. To the other or land-side side of the tongue B is attached the forward end of an inclined bar, D, the bars C D thus forming the perpendicular and hypotenuse of a right-angular triangle.

To the inclined bar D, near its forward end, is attached the forward end of a bar, E, which is placed parallel with the bar C. In bearings in the rear ends of the three bars C D E revolves the axle F. Upon the axle F, at the inner side of the straight side bar, C, revolves a wheel, G, which is thus placed directly in the rear of the plow H, so as to run upon the bottom of the furrow opened by the said plow. With this construction the wheel G will always have a smooth level bed to roll upon.

I is a smaller wheel, which revolves upon a journal at the other or land-side end of the axle F, so that the frame-work of the sulky may be level while the wheel G runs in the furrow and the wheel I runs upon the unplowed land. Upon the axle F, between the end of the inclined bar D and the smaller wheel, I, is formed a crank, $f'$, so that the lower sides of both wheels I G may be brought to the same level by turning the axle F. This construction allows the frame of the machine to be kept level when both wheels are running upon the unplowed land.

To the rear end of the plow-beam A, and to the rear end of the mold-board of the plow H, are attached the ends of two arms, J, which incline upward and rearward, and then extend rearward horizontally, so as to pass above the axle F. To the rear ends of the arms J are pivoted the ends of two crank-arms, K, rigidly attached to the axle F. To the inner crank-arm, K, or to the axle F, is rigidly attached the end of a lever, L, which projects upward into such a position that it may be readily reached and operated by the driver from his seat. With this construction, by operating the lever L, the plow H will be raised from the ground, and at the same time, and by the same movement, the smaller wheel, I, will be lowered to bring its lower side to a level with the lower side of the wheel G. The plow H moves upward, and the wheel I moves downward proportionately, so that the lever L may be also used for adjusting the plow to work at any desired depth in the ground.

The lever L should be provided with a catch to hold it securely in any position into which it may be adjusted.

To the crank-arm K, the lever L, or the axle F is rigidly attached a crank-arm, M, which has a pin or foot-rest attached to its outer end to receive the driver's foot, so that the driver can raise the plow with his foot when desired, both hands being left free for guiding and controlling the team.

To the axle F, directly beneath the arm J, attached to the rear end of the plow-beam A, is adjustably attached an eccentric collar, N, for the said arm J to rest upon when the plow is at work, so that the depth to which the plow enters the ground may be regulated by adjusting the said collar.

To the forward end of the plow-beam A is attached a clevis, O, the upper arms of which receive between them the end of the lever P, and have a pin or bolt, $o'$, attached to them to enter a slot in the forward end of the said lever P. The lever P is pivoted to and between the parallel bars C E of the frame-work, and its rear end extends back into such a position that it may be conveniently reached and operated by the driver from his seat, to raise and lower the forward end of the plow-beam A, as may be required. The lever P is provided with a lever pawl or catch, Q, which engages with the notches of the curved arm R, to hold the said lever P securely in any position into which it may be adjusted. The arm R passes through a slot or mortise in the lever P, and its lower end is pivoted to and rides upon the axle F.

To the rear end of the bar E is attached the lower end of the standard S, to the upper end of which the driver's seat T is secured. By this arrangement the most of the weight will be borne by the furrow-wheel G, the land-wheel I simply steadying and balancing the machine.

With this construction the downward pressure upon the plow will be sustained by the sulky, so that there will be very little friction between the bottom of the plow and the bottom of the furrow, so that the draft of the machine will be comparatively light. With this construction the wheel G runs in the furrow close in the rear of the plow H, so that the plow cannot throw sods against the wheel and clog or choke it. Whatever passes the plow goes to the rear, and cannot clog any part of the machine.

Another advantage of this construction is, that the work is done in front of the driver, so that he can see the work at all times without having to turn around.

Having thus described my invention, I claim as new and desire to secure by Letters Patent—

1. The sulky-frame C E D, the axle F, having a crank, $f'$, upon its land-side end, the larger furrow-wheel, G, and the smaller land-wheel, I, in combination with the lever L, cranks K, rigid arms J, and plow-beam A, whereby the plow is raised and the land-wheel lowered at one stroke of the lever, as specified.

2. The combination, with axle F, plow H, and beam A, of the arms J, crank-arms K, and lever L, as and for the purpose specified.

3. The combination of the two rigid arms J, the two crank-arms K, the hand-lever L, and the foot-lever M with the plow A H and the axle F of the sulky, substantially as herein shown and described.

WILLIAM JOHN MEHARRY.

Witnesses:
JAMES REIGART,
ROBERT BROWN,
DAVID GREENLEE.